United States Patent [19]

Itai

[11] Patent Number: 4,996,485
[45] Date of Patent: Feb. 26, 1991

[54] GAS INSULATED SWITCH DEVICE

[75] Inventor: Kosaku Itai, Amagasaki, Japan

[73] Assignee: Mitsubishi Denki Kabushiki Kaisha, Japan

[21] Appl. No.: 448,859

[22] Filed: Dec. 12, 1989

[30] Foreign Application Priority Data

Dec. 14, 1988 [JP] Japan ............... 63-316926

[51] Int. Cl.$^5$ ............................................. G01R 31/02
[52] U.S. Cl. ............................. 324/415; 200/148 B; 324/158 R
[58] Field of Search ........... 200/149 A, 144 R, 148 B, 200/146 A; 361/341, 335; 324/158 R, 415, 424

[56] References Cited

U.S. PATENT DOCUMENTS

| 4,687,890 | 8/1987 | Yamamoto et al. | 200/148 |
| 4,774,385 | 9/1988 | Toshima | 174/142 |
| 4,780,577 | 10/1988 | Toshima | 174/142 |
| 4,821,140 | 4/1989 | Takeuchi et al. | 361/341 |
| 4,821,141 | 4/1989 | Torimi et al. | 361/341 |
| 4,835,648 | 5/1989 | Yamauchi | 361/14 |

FOREIGN PATENT DOCUMENTS 0165184 12/1985 European Pat. Off. .
0244630 11/1987 European Pat. Off. .
2418559 9/1979 France .

OTHER PUBLICATIONS

Bischofberger et al., "Circuit-Breaker Type ELK with Closing Resistors", vol. 65, No. 4, Apr., 1978.

Primary Examiner—Reinhard J. Eisenzopf
Assistant Examiner—Robert W. Mueller
Attorney, Agent, or Firm—Leydig, Voit & Mayer

[57] ABSTRACT

Disclosed is a gas insulated switch device comprising at least two hollow cylindrical containers each accommodating top end portions of a system of line cables, and a disconnector having contacts coupled to the line cables via detachable conductors, wherein electrical tests on the cables, etc. in a first container can be conducted from a test window formed in a side wall of an adjacent second container, by means of a test tank attached thereto. The side walls of the first and second containers comprise a pair of opposing windows that are coupled to each other, via an electrically insulating spacer; branch conductors, which are disposed within the first container and have inner end portions that can be selectively coupled to the line cables or the contacts of the disconnector within the first container, comprise outer end portions projecting into the second container through the electrically insulating spacer disposed between two windows coupled to each other. The test tank, coupled to the test window of the second container, comprises test conductors which can be selectively coupled to: (1) the end portions of the branch conductors projecting into the second container, (2) the end portions of the branch conductors and the ends of the line cables within the second container, and (3) the contacts of the disconnector within the second container.

4 Claims, 6 Drawing Sheets

GAS INSULATED SWITCH DEVICE

BACKGROUND OF THE INVENTION

1. Field of the Invention

This invention relates to gas insulated switchgears, and more particularly to such switchgears including a plurality of containers each accommodating a disconnector for disconnectably connecting line cables to a main line via an interrupter, etc.

2. Description of the Related Art

Figure 1:
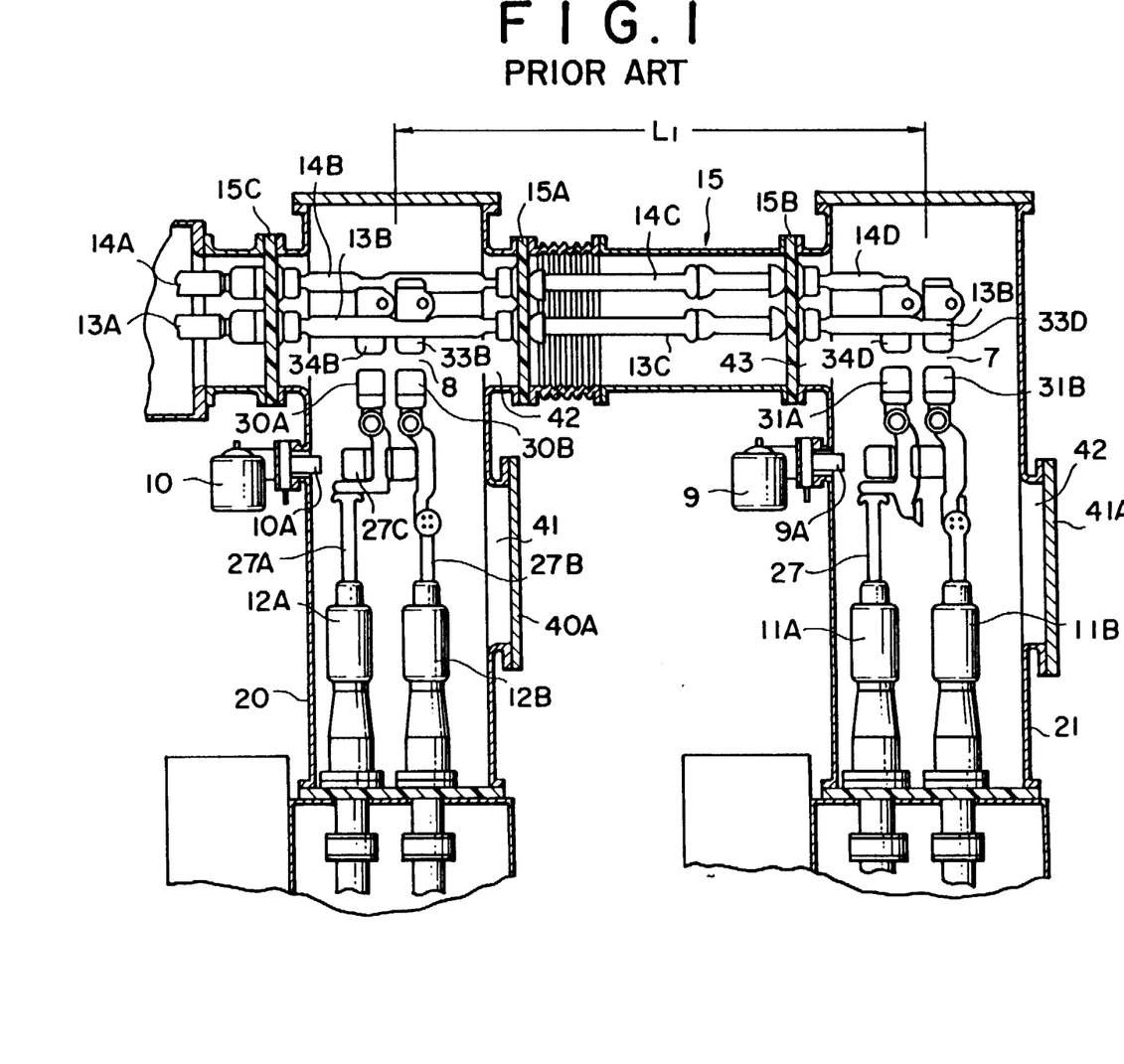

FIG. 1 shows a typical organization of a conventional gas insulated switch device including disconnectors for disconnectably connecting line cables to a main line via an interrupter, etc. In the figure, two containers 20 and 21 separated from each other by a central distance $L_1$ are connected to each other by means of a connection tank 15 attached to the windows 42 and 43 formed at upper portions of the two containers 20 and 21 respectively. The container 20 and the connection tank 15 are coupled to each other via an electrically insulating spacer 15A, while the container 21 and the connection tank 15 are coupled to each other via a electrically insulating spacer 15B. For simplicity, FIG. 1 shows only two containers 20 and 21; however, in actual service, further number of containers are connected in succession via connection tanks similar to the tank 15. At the upper portion of the container 20 are disposed connection conductors 13B and 14B; at the upper portion of the container 21, on the other hand, are disposed connection conductors 13D and 14D. The connection conductors 13B and 13D are electrically coupled to each other by means of a conductor 13C which is disposed within the connection tank 15 to extend through the electrically insulating spacers 15A and 15B; in a similar manner, the connection conductors 14B and 14D are connected to each other by means of a connection conductor 14C extending within the connection tank 15. Further, the connection conductors 13B and 14B extend, toward left in the figure, through an electrically insulating spacer 15C, to be coupled to connection conductors 13A and 14A, respectively, and thence to be led out into another container which is omitted in the figure.

At the bottom portion of the container 20 are disposed a first system of line cables 12A and 12B, at whose top ends are disposed contacts 30A and 30B of a first disconnector; the connection conductors 13B and 14B are provided with co-acting contacts 33B and 34B of the first disconnector, which are driven by means of a driving mechanism (not shown) to be brought into contact with the opposing contacts 30A and 30B, respectively, of the first disconnector. Further, on the top ends of a second system of line cables 11A and 11B disposed within the container 21 are provided contacts 31A and 31B; they are brought into contact with the co-acting contacts 33D and 34D disposed on the connection conductors 13D and 14D. Grounding devices 9 and 10 are provided with contacts 9A and 10A, which are driven by a driving device (not shown) to ground the line cables 11A and 11B and the line cables 12A and 12B, respectively, when necessary. The interior spaces within the containers 20 and 21 and the connection tank 15 are filled with an electrically insulating gas ($SF_6$ gas) for maintaining the electrical insulation therein.

In the gas insulated switch device constituted as described above, at side portions of the containers 20 and 21 are formed windows 41 and 42, respectively, for attaching test tanks thereto. Tests of the device are conducted when, for example, the device is first installed or when a failure occurs; during the usual service time when tests are not conducted, the windows 41 and 42 are sealed by means of closure plates 40A and 41A, respectively.

Figure 2:
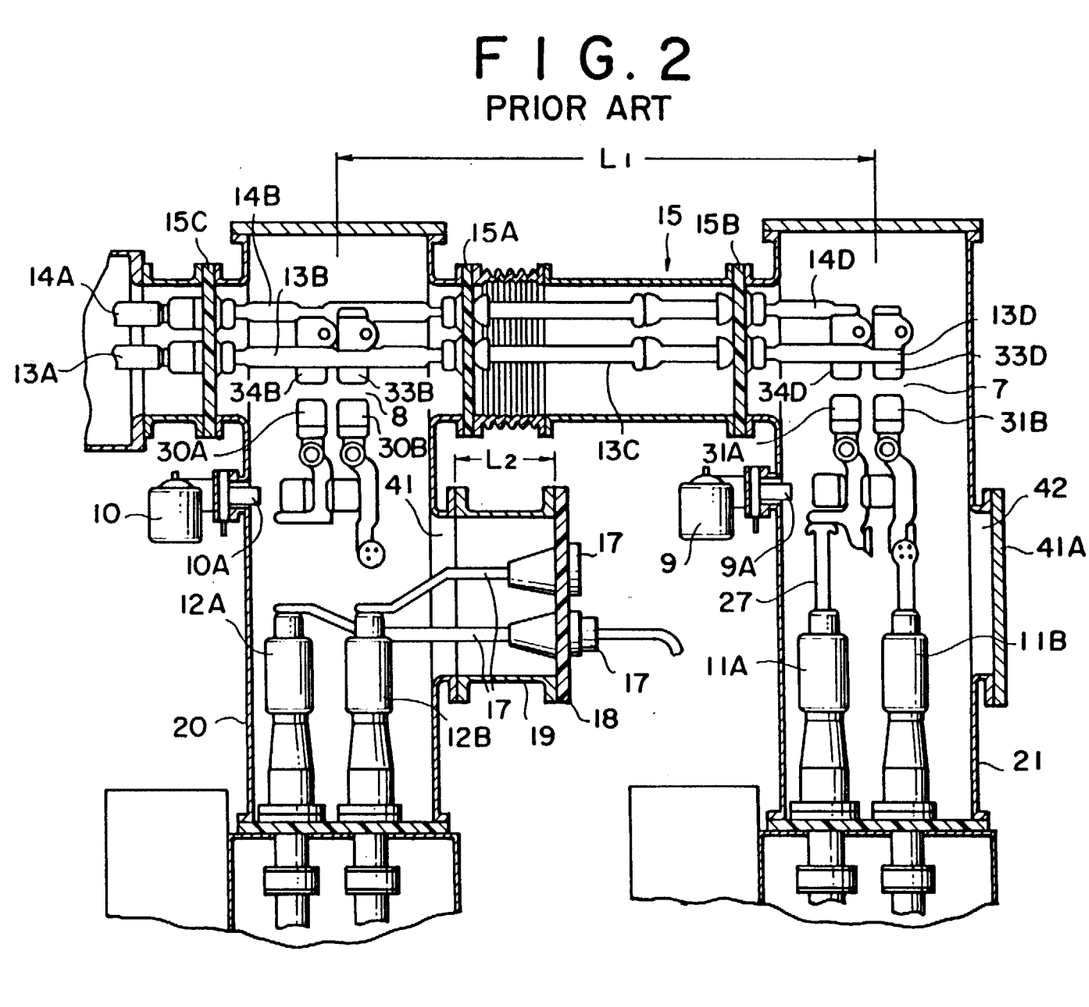

FIG. 2 shows the state in which a test tank 19 is attached to the window 41 of the container 20. Test conductors 17 are disposed on the panel 18 of the test tank 19, wherein it is possible, for example, to connect the ends of the conductors 17 to the line cables 12A and 12B as shown in FIG. 2, so as to Conduct a withstanding voltage test of the cables 12A and 12B. During this test, the detachable conductors 27A and 27B of the cables 12A and 12B shown in FIG. 1 are detached.

The above described switch device, however, has the following disadvantages. Namely, respective containers 20 and 21 are provided with respective test windows 41 and 42, so that the test tank 19 can be attached to either one of the windows 41 and 42. The test tank 19 requires a certain horizontal length $L_2$ for its attachment, due to the length of the test conductors 17 thereof. The central distance $L_1$ is provided for making possible the attachment of the test tank to each container. During service time, however, the space between the containers constitutes a dead space, which increases the whole dimension of the gas insulated switch device so that a large installation area is required.

SUMMARY OF THE INVENTION

It is therefore a primary object of this invention to provide a gas insulated switch device of the above type wherein the distance between the containers, and hence the installation space for the whole device, is reduced.

The above object is accomplished according to this invention by a gas insulated switch device including a plurality of containers each accommodating a disconnector for electrically disconnectably connecting line cables to a main line, in which the electrical tests with respect to cables, etc., accommodated in a certain container can be conducted from a test window of an adjacent neighboring container so that the above connection tank 15 for providing a central distance $L_1$ between the two containers can be dispensed with. To explain in greater detail, the switch device according to this invention comprises at least two containers each filled with an electrically insulating gas: a first hollow cylindrical closed container having an opening or window formed on a side wall thereof, and a second hollow cylindrical closed container disposed adjacent and axially parallel to the first container and having a window formed on a portion of a side wall thereof opposing the window of the first container, said window of the second container being coupled and sealed to the window of the first container, wherein the second container has a second window formed on another portion of the side wall thereof, the second window being closed by a detachable closure plate under a service condition and adapted to be coupled to a test tank including at least one test conductor. Further, a first and a second system of line cables (each including at least one line cable) have end portions extending into the first and the second container, respectively; in addition, disconnector means disconnectably connects the first and the second system of line cables to the main line, while connection conductor means electrically connects the first and the second system of line calbes to each other. Finally, at least one branch conductor is disposed within the first container, which branch conductor has one end projecting from the first into the second container via the windows of the first and second containers coupled to each other, the other end of the branch conductor being capable of taking a position at which the branch conductor is electrically coupled to the first system of line cables (or either to the first system of line cables or the contacts of the disconnector, when the first system of line cables and the disconnector means is coupled to each other via detachable conductors), wherein the end of the branch conductor projecting into the second container is adapted to be electrically coupled to the test conductor of the test tank when the test tank is coupled to the second window of the second container.

The novel features which are believed to be characteristic of this invention are set forth with particularity in the appended claims. This invention itself, however, both as to its organization and method of operation, may be best understood from the following detailed description of the preferred embodiments, taken in connection with the accompanying drawings.

BRIEF DESCRIPTION OF THE DRAWINGS

FIGS. 1 and 2 are sectional side views of a conventional gas insulated switch device, wherein FIG. 1 shows the device under usual service condition while FIG. 2 shows it under test condition;

FIGS. 8 through 6 are sectional side views of a gas insulated switch device according to this invention, wherein FIG. 3 shows the device under usual service condition while FIGS. 4 through 6 show it under various test conditions.

In the drawings, like reference numerals or signs represent like or corresponding parts or portions.

DETAILED DESCRIPTION OF THE PREFERRED EMBODIMENTS

Referring now to FIGS. 3 through 7 of the drawings, let us describe a gas insulated switch device according to an embodiment of this invention. The gas insulated switch device comprises a plurality of containers each accommodating end or terminal portions of a system of line cables and a disconnector for disconnectably connecting the line cables to a main line via an interrupter, etc.; the figures show two adjacent neighboring containers of the gas insulated switch device.

Figure 3:
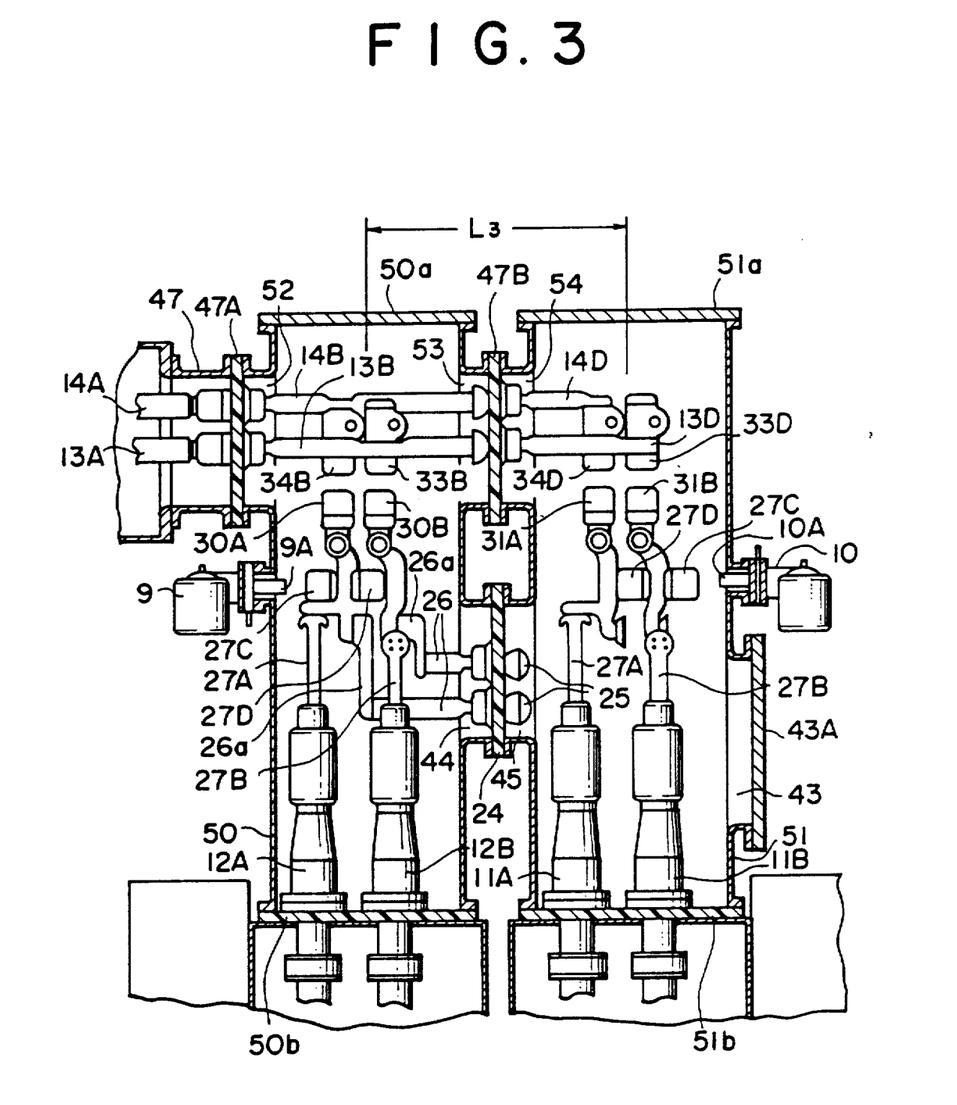

FIG. 3 shows the device under the usual service condition. Referring to FIG. 3, let us first describe the housing structure of the device.

First hollow cylindrical container 50 shown at the left in the figure comprises three openings or windows: two axially aligned windows 53 and 44 (shown at the right side in the figure) formed on a side wall thereof opposing an adjacent second container 51, and a window 52 formed on a portion of the side wall thereof opposite to the window 53. The top and bottom ends of the container 50 are closed by a top and a bottom plate 50a and 50b, respectively. Second hollow cylindrical container 51, which is adjacent to the first container 50 and shown at the right in the figure, and whose top and bottom ends are closed by a top and a bottom end plate 51a and 51b, respectively, comprises two windows 54 and 45 formed in the side wall thereof opposing the windows 53 and 44 of the first container 50; the two opposing windows 53 and 54 of the first and second containers 50 and 51 are coupled in an air-tight manner to each other via an electrically insulating spacer 47B; similarly, the two opposing windows 44 and 45 are coupled in an air-tight manner to each other via an electrically insulating spacer 24. The second container 51 further comprises a test window 43 formed at a side opposite to the window 45, which test window 43 is closed and sealed by a closure plate 43A under usual service condition. On the other hand, the window 52 at the left of the first container 50 in the figure is coupled in an air-tight manner to a window 47 of another container (not shown) adjacent to the first container 50, via an electrically insulating spacer 47A. The interior spaces of the containers 50 and 51 are filled with an electrically insulating gas such as $SF_6$ gas.

Next, the electrical structures of the gas insulated switch device accommodated within the containers are described.

First, let us describe the electrical structure within the first container 50. First system of line cables (two thereof 12A and 12B are shown in FIG. 3) extends upward through the bottom end plate 50b to terminate within the first container 50; as shown schematically in FIG. 7, the first system of line cables, which usually constitutes a three phase system, comprises three line cables 12A through 12C. (In the following, however, for the sake of simplicity, reference is made only to two line cables 12A and 12B which are represented in FIG. 3.) The top end portions of the line cables 12A through 12C are electrically coupled, via respective detachable conductors 27A and 27B, to respective lower contacts 30A and 30B of a first disconnector having co-acting opposing contacts 34B and 33B, which are supported by and electrically coupled to the respective connection conductors 14B and 13B disposed at the upper portion within the first container 50. The co-acting contacts 34B and 33B are driven and translated downwardly by a driving mechanism (not shown) to be brought into electrical contact with respective opposing lower contacts 30A and 30B. Toward right in the figure, the connection conductors 14B and 13B extend through the electrically insulating spacer 47B to be electrically coupled to respective connection conductors 14D and 13D within the adjacent second container 51; similarly, toward left, the connection conductors 14B and 13B extend through the electrically insulating spacer 47A to be electrically coupled to connection conductors 14A and 13A, respectively, within an adjacent container not shown in the figure.

Further, a grounding device 9 mounted on a side wall of the first container 50 comprises a contact 9A which is driven by a driving mechanism (not shown) to be brought into electrical contact with contacts 27C and 27D electrically coupled to the contacts 30A and 30B of the first disconnector, so as to ground the first system of line cables 12A and 12B. Furthermore, branch conductors 26 for providing electrical connection from the first system of line cables 12A and 12B, or from the contacts 30A and 30B of the first disconnector, to test conductors, as described hereinbelow, are disposed within the first container 50. The description of the branch conductors 26 is made further below.

The electrical organization within the second container 51 is similar to that within the first container 50, except that no the branch conductors are provided. Thus, second system of line cables including three cables 11A through 11C as represented schematically in FIG. 7, of which two, 11A and 11B, are represented in FIG. 3, extend through the bottom end plate 51b to terminate in the second container 51. The top end portions of the cables 11A and 11B are coupled, via respective detachable conductors 27A and 27B, to lower contacts 31A and 31B of a second disconnector having upper co-acting contacts 34D and 33D disengageably engaging with the lower contacts 31A and 31B. The co-acting contacts 34D and 33D, which are supported by and electrically coupled to respective connection conductors 14D and 13D, are driven by a driving mechanism (not shown) to be brought into electrical contact with respective opposing lower contacts 31A and 31B of the second disconnector. The grounding device 10 mounted to the side wall of the second container 51 comprises a contact 10A which is moved by a driving mechanism (not shown) to be brought into contact with the contacts 27D and 27C electrically coupled to the contacts 31A and 31B of the second disconnector, so as to ground the second system of line cables 11A and 11B.

Now let us describe the structure and method of operation of the branch conductors 26 disposed within the first container 50 for the purpose of providing electrical connection during the test time when electrical tests are conducted on the line cables and the disconnectors. The branch conductors 26 (three in number in the case of three phase system) have end portions 25 supported by the electrically insulating spacer 24 between the two windows 44 and 45, and projecting therefrom into the interior of the second container 51; branch conductors 26 extend through the electrically insulating spacer 24 to be electrically coupled to respective end portions 25 thereof. The branch conductors 26 comprise joints so that the inner end portions thereof 26aare capable of taking two positions: a first position shown in FIGS. 3 and 6, at which the inner end portions 26a of the branch conductors 26 are coupled electrically to respective lower contacts of the first disconnector for the first system of line cables 12A and 12B; and a second position shown in FIGS. 4 and 5, at which the inner end portions 26a of the branch conductors 26 are coupled directly to the top end portions of the first system of line cables 12A and 12B respectively.

Figure 4:
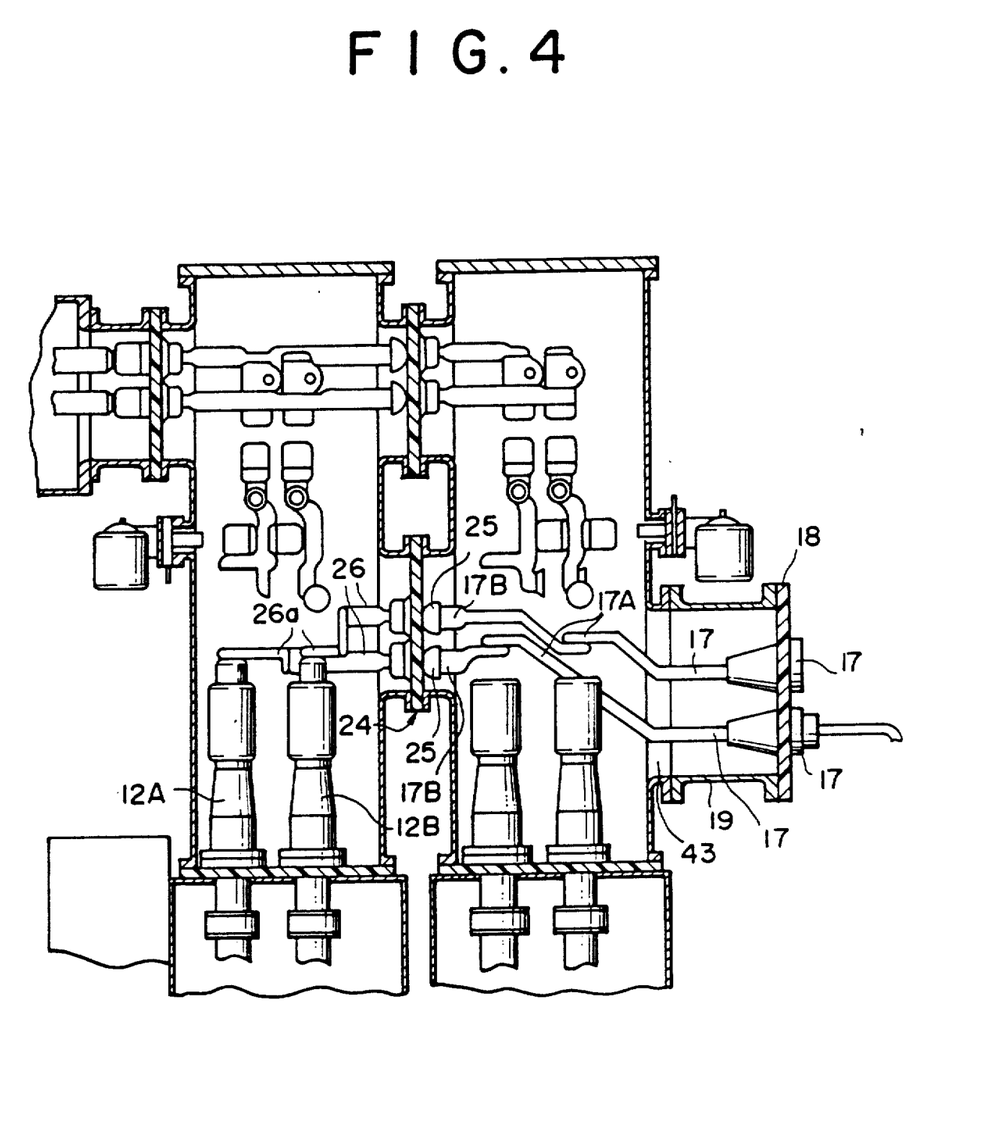
Figure 5:
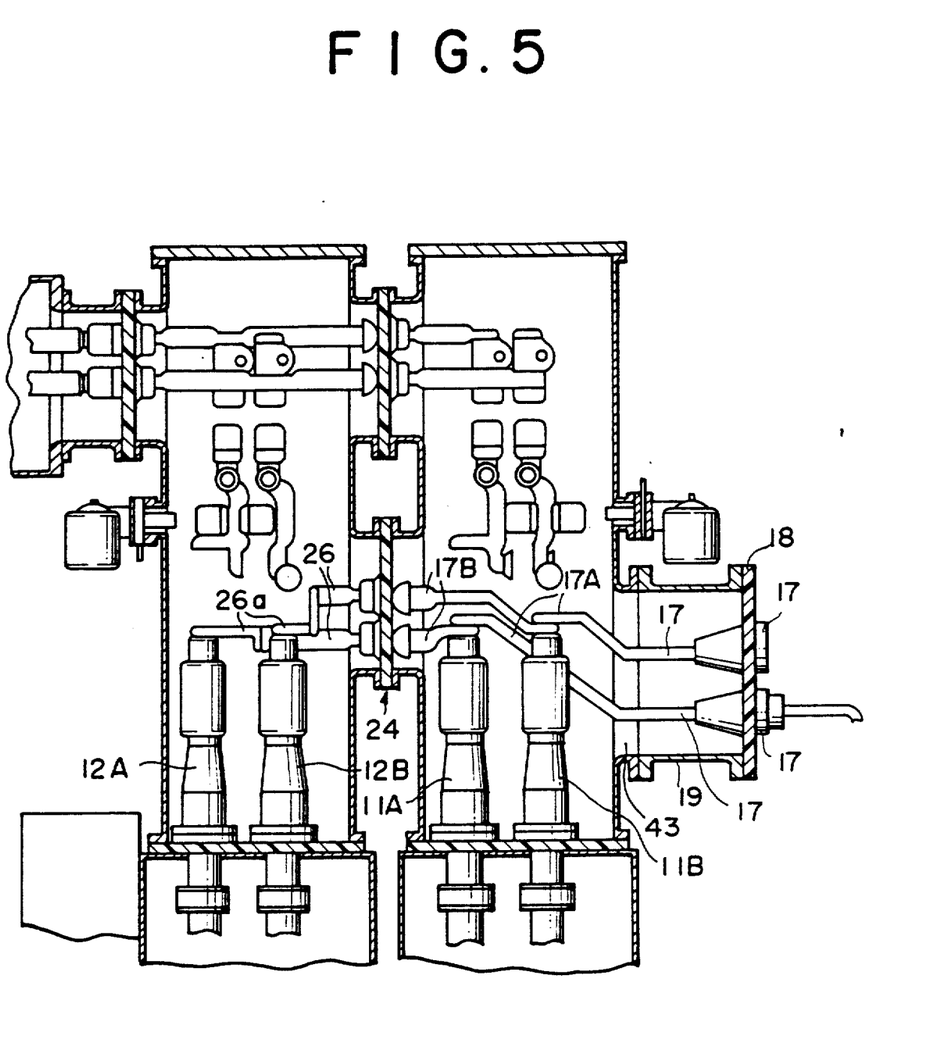
Figure 6:
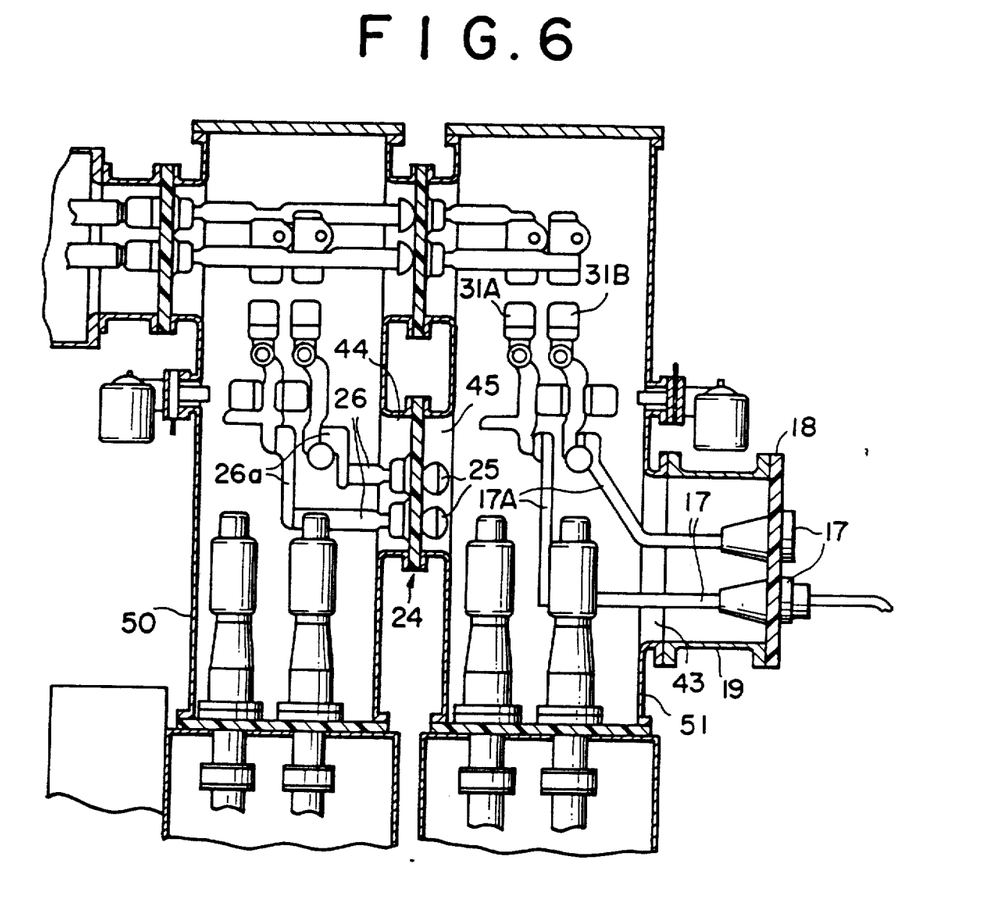
Figure 7:
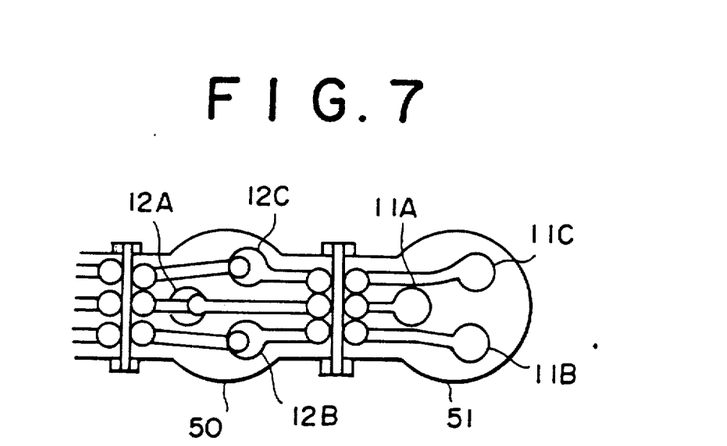
FIG. 7 is a schematic top sectional view of the gas insulated switch device of FIGS. 3 through 6, showing the arrangement of the line cables within the containers.

Electrical tests are conducted as follows: When electrical tests are conducted on the gas insulated switch device, the closure plate 43A is removed from the test window 43 of the second container 51 and a hollow cylindrical test tank 19 is attached to the test window 43, as shown in FIGS. 4 through 6. As shown in FIGS. 4 through 6, unnecessary connection members such as the detachable conductors 27A and 27B are detached and removed during the test, so as to electrically disconnect the line cables 12A, 12B, 11A, and 11B from respective contacts of the disconnectors. On the other hand, the test tank 19 comprises test conductors 17 supported on an end panel 18 through which outer end portions of the test conductors 17 extend. Inner end portions 17A of the test conductors 17 are capable of taking three different electrical connections:

(1) First, as shown in FIG. 4, the end portions 17A of the test conductors 17 may be coupled, via respective intermediate conductors 17B thereof, to the end portions 25 of the branch conductors 26 which project into he second container 51, the test conductors 17 being electrically disconnected from the second system of line cables 11A and 11B and from the contacts 31A and 31B of the second disconnector. When the branch conductors 26 are electrically coupled, as shown in FIG. 4, directly to respective first system of line cables 12A and 12B, electrical tests may be conducted on these line cables 12A and 12B.

(2) Second, as shown in FIG. 5, the end portions 17A of the test conductors 17 may be electrically coupled, via respective intermediate conductors 17B thereof, to the end portions 25 of the branch conductors 26 which project into the second container 51, the end portions 17A of the test conductors 17 being electrically connected to the second system of line cables 11A and 11B. When the branch conductors 26 are coupled, as shown in FIG. 5, directly to respective line cables 12A and 12B of the first system of line cables, electrical tests may be conducted on the line cables 12A, 12B, 11A, and 11B.

(3) Third, as shown in FIG. 6, the end portions 17A of the test conductors 17 may be electrically coupled to the contacts 31A and 31B. Further, the branch conductors 26 may be coupled, as shown in FIG. 6, to respective contacts 31A and 31B of the second disconnector for the second system of line calbes 11A and 11B. Then, electrical tests may be conducted on the performance of the disconnectors.

It is noted that the connection tank can be dispensed with according to this invention; thus, the central distance $L_3$, between adjacent containers 50 and 51 shown in FIG. 3, and hence the installation space of the gas insulated switch device, can be minimized according to this invention.

It is further noted that the provision of an electrically insulating spacer 24 between the windows 44 and 45 of the two adjacent containers 50 and 51 is not essential; namely, provided that the end portions 25 of the branch conductors 26 can be supported by some other appropriate means, the electrically insulating spacer 24 can be dispensed with.

While description has been made of the particular embodiments of this invention, it will be understood that many modifications may be made without departing from the spirit thereof; the appended claims are contemplated to cover any such modifications as fall within the true spirit and scope of this invention.

What is claimed is:

1. A gas insulated switch device for electrically disconnectably connecting systems of line cables to a main line, comprising:
   a first hollow cylindrical closed container having a window formed on a side wall thereof, the first container being filled with an electrically insulating gas;
   a second hollow cylindrical closed container disposed adjacent and axially parallel to the first container and having a window formed on a portion of a side wall thereof opposing said window of the first container, said window of the second container being coupled and sealed to said window of the first container, the second container being filled with an electrically insulating gas, wherein the second container has a second window formed on another portion of the side wall thereof, said second window being closed by a detachable closure plate under a service condition and adapted to be coupled to a test tank including at least one test conductor;
   a first system of line cables including at least one line cable having an end portion extending into said first container;

a second system of line cables including at least one line cable having an end portion extending into said second container;

disconnector means for electrically disconnectably connecting the line cables of said first and second systems of line cables to the main line;

connection conductor means for electrically connecting the line cables of said first and second systems of line cables; and at least one branch conductor disposed within the first container and having one end projecting from the first into the second container via said windows of the first and second containers coupled to each other, the other end of the branch conductor being capable of being electrically coupled to the line cable of the first system of line cables, wherein said one end of the branch conductor projecting into the second container is adapted to be electrically coupled to the test conductor of the test tank when the test tank is coupled to the second window of the second container.

2. A test tank for conducting tests on the gas insulated switch device as claimed in claim 1, comprising:

a hollow cylindrical tank having an open end adapted to be coupled to said second window of the second container; and at least one test conductor which, when the tank is coupled to the second window of the second container, is capable of taking a first position at which the test conductor is coupled to the line cable of the second system of line cables, and a second position at which the test conductor is coupled to said one end of the branch conductor projecting into the second container.

3. A gas insulated switch device, comprising:

a first hollow cylindrical container having a first and a second window formed on a side wall thereof, two ends of the first container being closed by end plates, and the first container being filled with an electrically insulating gas;

a second hollow cylindrical container disposed adjacent and axially parallel to the first container and having a first and a second window formed on a portion of a side wall thereof opposing said first and second windows of the first container, respectively, so as to be coupled and sealed to the first and second windows of the first container, respectively, two ends of the second container being closed by end plates, and said second container being filled with an electrically insulating gas, wherein said second container has a third window formed on another portion of the side wall thereof, said third window being closed by a detachable closure plate under a service condition and adapted to be coupled to a detachable test tank including at least one test conductor when electrical tests are conducted;

a first system of line cables including at least one line cable having an end portion extending into said first container through an end plate thereof, to be electrically coupled, via a detachable conductor, to a disconnector which comprises a contact coupled to the line cable of the first system via the detachable conductor, and a co-acting contact disengageably engaging therewith;

a second system of line cables including at least one line cable having an end portion extending into the second container through an end plate thereof, to be electrically coupled, via a detachable conductor, to a disconnector which comprises a contact coupled to the line cable of the second system via the detachable conductor, and a co-acting contact disengageably engaging therewith;

at least one connection conductor extending through said first windows of the first and second containers in both directions into said first and second containers, so as to be coupled electrically at two ends thereof to said co-acting contacts of the disconnectors of the first and second system of line cables, respectively;

at least one branch conductor disposed within the first container, said branch conductor having one end projecting from the first into the second container via the second windows of the first and second containers coupled to each other, wherein the other end of said branch conductor is capable of taking a first position at which the branch conductor is electrically coupled to the line cable of the first system of line cables, and a second position at which the branch conductor is electrically coupled to the contact of the disconnector of the first system of line cables within the first container, and further, wherein said one end of the branch conductor projecting into the second container is adapted to be coupled to the test conductor of the test tank.

4. A test tank for conducting tests on the gas insulated switch device as claimed in claim 3, comprising:

a hollow cylindrical tank having an open end adapted to be coupled to said third window of the second container; and at least one test conductor including an end portion which, when the tank is coupled to the third window of the second container, is capable of taking any one of the following three positions: a first position at which the test conductor is coupled to said one end of the branch conductor projecting into the second container while being electrically disconnected from the line cable of the second system of line cables and from the contact of the disconnector of the second system of line cables; a second position at which the test conductor is coupled to both said one end of the branch conductor projecting into the second container and the line conductor of the second system of line cables; and a third position at which the test conductor is electrically coupled to the contact of the disconnector of the second system of line cables.

* * * * *